Figure 1:
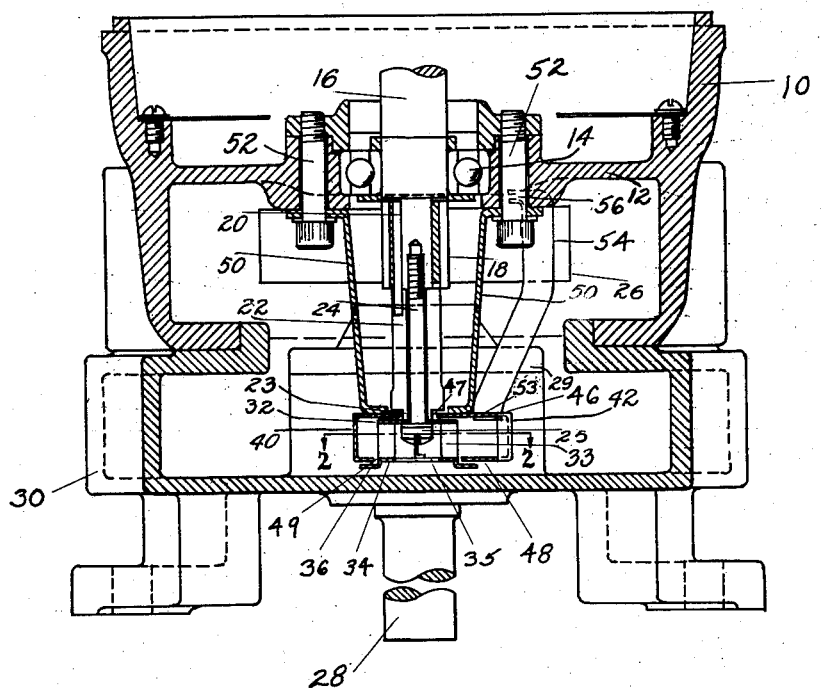

May 17, 1949.    C. O'DANIEL    2,470,365
OIL PUMP FOR DYNAMOELECTRIC MACHINES
Filed Oct. 31, 1946

INVENTOR:
CLARENCE O'DANIEL
BY
Roy M. Eilers
ATTORNEYS.

Patented May 17, 1949

2,470,365

UNITED STATES PATENT OFFICE 2,470,365

OIL PUMP FOR DYNAMOELECTRIC MACHINES

Clarence O'Daniel, Richmond Heights, Mo., assignor to Century Electric Company, a corporation of Missouri Application October 31, 1946, Serial No. 707,009

12 Claims. (Cl. 103—103)

1

This invention relates to improvements in dynamo electric machines. More particularly, this invention relates to improvements in centrifugal pumps that are used with dynamo electric machines to force oil upwardly against the force of gravity and into the proximity of the bearings of the dynamo electric machines or gears carried by the dynamo electric machine.

It is, therefore, an object of the present invention to provide an improved centrifugal pump that can be used with a dynamo electric machine to force oil upwardly against the force of gravity and into the proximity of the bearings of the dynamo electric machine or gears carried by the dynamo electric machine.

Where dynamo electric machines are set so their shafts operate in a vertical position, it is necessary to provide some means by which oil can be collected in the vicinity of the lower end of the shaft and can be moved upwardly against the force of gravity to the proximity of the bearing that supports the shaft. Once the oil has been raised up to the level of the bearing, it can be permitted to contact that bearing and then flow downwardly to the vicinity of the lower end of the shaft. Where the dynamo electric machines are integrally connected to a gear train or other rotative equipment, the oil-raising means must raise enough oil to provide adequate lubrication of the gear train as well as the bearing. In the past, various methods and apparatus have been proposed to raise oil from the vicinity of the lower end of the shaft to the vicinity of the bearings and gears associated with the shaft and thus facilitate lubrication of the bearings and gears. One such method provided grooves in the shaft or grooves in the sleeve surrounding the shaft and relied upon the frictional forces between the rotating shaft and the oil to move the oil upwardly along the grooves to the vicinity of the bearing or gears where the oil could be distributed over the bearing or could be distributed over gears secured to the shaft. Another such method relied upon an impeller which admixed air with oil and then directed the mixture of oil and air upwardly through appropriate channels to the vicinity of the bearing or gear associated with the shaft. In still other methods, turbines or pumps were secured to and rotated with the shafts and acted to raise oil to the level of the bearings or gears where it could be used to lubricate the bearings or gears. The use of rotatable pumps is, from considerations of cost, convenience and efficiency, the most satisfactory of the various proposed methods, but most of the small size pumps

2 usable in dynamo electric machines have been operated in relatively large chambers or housings that permitted considerable oil leakage, and as a result, the pumps have been able to provide only a limited amount of pressure on the oil. Moreover, most of those pumps have been limited to operation in one direction and have been of rather limited capacity. Consequently, the benefit obtained from the use of such pumps has been rather small and the amount of lubricant handled by such pumps and the distance that the lubricant was raised by the pumps has been inadequate for many installations. This is objectionable since it keeps the dynamo electric machines and the rotative equipment, integrally connected therewith, from obtaining the necessary amount of lubrication. The present invention obviates these objections by providing an improved pump for dynamo electric machines which is able to pump oil irrespective of the direction of rotation of the shaft, and is able to pump that oil so it can rise several inches along the shaft. It is, therefore, an object of the present invention to provide a pump for dynamo electric machines that can operate in either direction and can raise oil several inches along the shaft.

The present invention does this by providing a pressure chamber with a rotor therein and by providing the rotor with radially-extending blades that move closely adjacent the upper and lower surfaces of a substantially oil-tight chamber. Where this is done, the oil can be drawn into the chamber and can be forced outwardly by the straight, radially-extending blades to create pressures in the chamber; those pressures will act to raise the oil to the desired level along the shaft. It is, therefore, an object of the present invention to provide a housing or chamber that is substantially oil-tight and is provided with a rotor that has radially-extending blades and that rotates closely adjacent the upper and lower surfaces of the chamber.

The pressure chamber of the present invention is of novel form, and it permits the rotor to create sizable pressures no matter which way the rotor moves. This chamber has a cylindrical wall section as a major portion thereof and as the minor portion thereof it has a small-radius arcuate wall section and two plane wall sections that are each tangential to the cylindrical wall section and the arcuate wall section. The two plane wall sections of the chamber are equal in length and area, and they merge smoothly into the cylindrical wall section and the small-radius arcuate section. The top of the chamber has an opening that fits closely around the impeller-carrying shaft and the centrifugal impeller which rotates closely adjacent the under surface of the top of the chamber is secured to the shaft in such a way that oil cannot pass between the impeller and the shaft. The bottom of the chamber has a large opening that is somewhat larger than the outside diameter of the rotary impeller and the impeller has an offset flange which underlies and rotates very closely adjacent the bottom of the chamber. This construction is highly desirable because it permits the rotary impeller to operate as efficiently when the dynamo electric machine is rotating in a clockwise direction as it does when that machine is rotating in a counterclockwise direction; it also provides a substantially oil-tight seal-free chamber for the impeller, thus permitting the creation of sizeable pressures on the oil without increasing the friction of the rotating parts of the device. Moreover, by having the impeller secured to the shaft in such a way that oil can pass between the impeller and the shaft and by having the impeller underlie and rotate closely adjacent the under surface of the top of the chamber, the invention keeps oil from leaking out of the top of the chamber because any oil that tends to escape from the chamber by passing between the rotating impeller and the chamber will have to move inwardly to reach the opening, and such movement will be resisted and prevented by the centrifugal force generated in the oil as it is forced to move with the impeller. Consequently, it would be extremely difficult for oil to leak out of the top of the chamber. The offset flange on the bottom of the rotary impeller will be precisely parallel with the bottom of the chamber and will rotate very close to it, thereby providing a very narrow gap through which it would be extremely difficult for oil to force its way. Moreover, the offset can be made quite sharp so that any oil which tended to pass between the offset flange of the impeller and the bottom of the chamber would have to change direction in extremely close quarters. This provides additional resistance to leakage of oil, and thus there is but little tendency for oil to leak out along the radial offset flange. The outlet of the chamber through which the oil is to flow is spaced in the small-radius arcuate wall section and it is quite large, thus offering ready exit for the oil and the high resistance offered to leakage from the chamber makes sure that the oil will flow freely into the exit tube. Thus the present invention provides an efficient pump that can operate in either direction to raise oil several inches along the shaft.

Other objects and advantages of the present invention should become apparent from an examination of the drawing and accompanying description.

In the drawing and accompanying description, a preferred embodiment of the present invention is shown and described but it is to be understood that the drawing and accompanying description are for the purposes of illustration only and that the invention will be defined by the appended claims.

Figure 2:
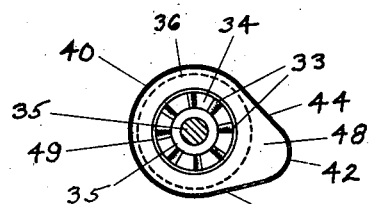

In the drawing, Fig. 1 is a cross-sectional side view of an end bell of a dynamo electric machine, and it shows the centrifugal pump used with the dynamo electric machine to force oil upwardly into proximity with the bearing and the gears associated with the shaft, and Fig. 2 is a cross-sectional plan view of the centrifugal pump taken along the plane indicated by the line 2—2 in Fig. 1 and it shows the details of the housing and impeller of the pump.

Referring to the drawing in detail, the end bracket of a dynamo electric machine is denoted by the numeral 10 and this end bracket has a web 12 which supports the outer race of an anti-friction bearing 14. The inner race of the anti-friction bearing 14 rotatably supports the shaft 16 of a dynamo electric machine in a vertical position and the shaft 16 rotatably supports a pinion 18 which is keyed to the shaft 16 by means of the key 20. The key 20 also extends downwardly below the end of the shaft 16 and extends into a recess in the shaft extension 22 which is secured to the shaft 16 by means of the bolt 24 that telescopes into and through the shaft extension 22. A large gear 26 meshes with the pinion 18 and the gear 26 is supported by and is rotatable with the shaft 28 which is spaced behind the rotatable shaft 16 and is supported in suitable bearings, not shown.

An oil reservoir 30 is connected to the lower end of the end bracket 10 and is sealed to the end bracket 10 by a seal which is substantially oil-tight and the shaft extension 22 projects downwardly into the oil reservoir 30 and is immersed in the oil therein. The oil reservoir 30 is provided with an upstanding projection 29 of annular form that surrounds the shaft 28 and the projection 29 has the bearings, not shown, that support the shaft 28 and permit ready rotation of that shaft relative to the oil reservoir 30. The upper end of the projection 29 extends above the level of the oil in the reservoir and keeps the oil in the reservoir from flowing to the shaft 28 and then leaking down along that shaft. In addition, the projection 29 can be provided with an oil seal that will keep oil, that may splash into the projection 29, from leaking down along the shaft 28. In this way, it is possible to have the shaft 28 extend through the bottom of the reservoir 30 without permitting leakage of oil from the reservoir 30.

Secured to and rotatable with the end of the shaft extension 22, and immersed in the oil in the reservoir 30, is a pump rotor which has a radially extending upper wall 32 with a central opening therethrough and that opening closely encircles and seats against the bolt 24 which cooperates with the key 20 to secure the shaft extension 22 to the shaft 16. The shaft extension 22 is provided with a section of reduced diameter 23 and the section 23 cooperates with the head 25 of the bolt 24 to secure the upper wall 32 of the pump rotor to the shaft extension 22 in such a way that the wall 32 acts as an imperforate plate or wall. Thus no oil can pass between the shaft extension 22 and the wall 32. Attached to the under surface of the wall 32, as by soldering, welding, brazing or other means, are a plurality of radially-disposed rotor blades 33 and the blades 33 are disposed around the periphery of the upper wall 32. The blades 33 have an L-shaped configuration and the bottom portions thereof are soldered, welded, brazed or otherwise secured to the lower wall 34 of the pump rotor. The axially extending portions of the rotor blades 33 are substantially plane and will act to pump oil irrespective of the direction of rotation of the pump rotor. The lower wall 34 of the pump rotor is annular in form since it has the central opening 35 and the rotor blade 33 extend from the inner periphery to the outer periphery of the wall 34. The lower wall 34 of the pump rotor also has an offset flange 36 of annular shape that is spaced from the main part of the lower wall 34 by a very abrupt bend. This pump rotor will be immersed in the oil in the reservoir 30 and will exert centrifugal forces on that oil irrespective of the direction of rotation of the shaft 16.

A pump chamber is provided that surrounds the pump rotor and makes it possible to place the oil under pressure and cause that oil to move in response to that pressure. The pump chamber has a generally cylindrical wall section 40 that constitutes the major portion of the wall of the chamber, it has a small-diameter arcuate wall section 42 and it has two plane wall sections 44 that are both tangential to each of the wall sections 40 and 42. Moreover, the wall sections 44 are of equal length and area, and they provide a smooth interior for the chamber. The pump chamber is provided with a top 46 that has a central opening 47 therethrough and the opening 47 is dimensioned to encircle the reduced diameter section 23 of the shaft extension 22 and to permit rotation of the shaft extension 22 without contact with the top 46. However, the top 46 is positioned closely adjacent the large-diameter section of the shaft extension 22 and that section of the shaft extension overlies part of the top 46; thus overlying the annular gap between the opening 47 and the reduced diameter section 23. The bottom 48 of the chamber has an opening 49 therethrough and this opening has a diameter which is slightly larger than the lower wall 34 of the pump rotor but is considerably smaller than the diameter of the offset annular flange 36. The walls 40, 42 and 44 of the chamber are dimensioned so the lower surface of the top 46 and the lower surface of the bottom 48 closely approach the upper surface of the wall 32 and the upper surface of the offset 36 respectively, thus forming gaps through which oil can pass only with difficulty. The chamber for the pump is held in position by the depending bracket members 50 secured to the web 12 of the end bracket 10 by means of bolts 52 and the bracket members 50 maintain the oil chamber precisely centered relative to the shaft extension 22 and the pump rotor carried thereby.

The upper surface of the oil chamber is provided with an opening 53 that is eccentric to the shaft extension 22, and the opening 53 receives a generally vertical oil duct 54 which extends up into the vicinity of the bearing 14 and the gears 18 and 26. The upper end of the conduit 54 is bent to form a horizontally-directed nozzle 56. This nozzle 56 will direct oil issuing from the duct 54 toward the shaft 16 and that oil will splash onto the bearing 14 and the gears 18 and 26.

As indicated by dotted lines in Fig. 1 of the drawing, the reservoir 30 will have an oil level which is considerably above the top of the pump chamber thus making sure that oil will completely fill both the pump chamber and the pump rotor. This oil can enter the pump chamber through the opening 49 in the bottom of the chamber and it can enter the pump rotor through the opening 35 in the bottom of the rotor. The rotor will rotate in response to rotation of the shaft 16 and it will apply forces to the oil by means of the radially-disposed blades 33, thus causing the oil to move outwardly as a result of centrifugal forces. As the pump rotor gains speed, the oil will be forced adjacent the cylindrical wall section 40 and the small-radius wall section 42 as well as the plane wall sections 44, and the oil will be placed under considerable pressure. This pressure will not be dissipated by leakage of oil out of the pump chamber through the gaps between the pump rotor and the pump chamber, and the undiminished pressure will force the oil to move upwardly through the conduit 54 and out through the nozzle 56 toward the shaft 16. Thereafter, the oil will lubricate the bearing 14 and the gears 18 and 26 before it drips down into the reservoir 30 in response to the force of gravity. From the reservoir 30, the oil can be recirculated by the pump.

Sizeable oil pressures can be generated in the pump chamber because the oil will be unable to pass outwardly from the chamber through the narrow gaps between the rotating surfaces of the pump rotor and the adjacent surfaces of the pump chamber. In addition, the fact that the top 32 of the rotor underlies and is closely adjacent the top 46 of the oil chamber, and the fact that the bottom 48 of the chamber overlies and is closely adjacent the offset 36 of the pump rotor, means that oil tending to pass between the pump rotor and the pump chamber would have to follow a narrow, tortuous path and such a path will positively deter oil flow. Moreover, oil tending to escape from the top of the pump chamber will have to move inwardly along the top 32 of the pump rotor and in doing so it will be speeded up by reason of the friction between the oil and the top 32 of the rotor, and it will be given an outwardly directed centrifugal force that will hold the oil against further inward movement.

The dynamo electric machine has a bearing, not shown, at the upper end of the shaft 16 and that bearing will cooperate with bearing 14 to maintain the shaft 16 in position. The upper bearing may be of the type which is provided with an initial charge of grease that is adequate to provide lubrication throughout the life of the dynamo electric machine and in such case, the upper bearing will not need a lubrication system. Where such a bearing is not used, a separate oiling system can be provided for the upper bearing of the shaft.

This construction has been found to be so substantially oil-tight that, in a dynamo electric machine operating at seventeen hundred and fifty (1750) revolutions per minute, a rotor with an outside diameter of one and one quarter inches has raised oil along the shaft extension 22 and the shaft 16 as many as twelve (12) inches and has exerted a pressure of four tenths (0.4) of a pound on that oil. Such a pressure is more than adequate to supply all of the lubrication needs of the gears 18 and 26 as well as the bearing 14.

Whereas a preferred embodiment of the present invention has been shown and described in the drawing and accompanying description, it is obvious to those skilled in the art that various changes can be made in the form of the invention without affecting the scope thereof.

What I claim is:

1. The combination of a vertically-disposed rotatable shaft, a rotary impeller secured to and rotatable with the end of said shaft, a chamber surrounding said impeller, and a vertically-disposed exit for oil that conducts oil up to and along the vertically-disposed shaft, said impeller having an upper wall surface that is secured to and fits over said shaft and cooperates with said shaft to provide an imperforate upper surface for said impeller, said impeller having a perforate lower wall that is positioned under said upper wall and is provided with an offset flange of annular shape, said rotary impeller having a plurality of plane, vertically-disposed, radially-extending impeller blades that are contiguous with the inner periphery of the lower wall of the impeller and extend to the outer periphery of the upper wall of the impeller, said chamber having a top that is imperforate except for an opening that receives said shaft and a second opening that receives an oil duct, said first opening being dimensioned so it closely encircles said shaft, said chamber having a bottom with a large opening therein, and said chamber having a wall connecting said top and bottom and having the major portion thereof of cylindrical form and having a small portion thereof formed by an arcuate section and two plane portions that are tangential to each of the cylindrical and arcuate sections, said bottom of said chamber extending inwardly and overlying said annular flange of said rotary impeller but being spaced a short distance from the outer periphery of said impeller blades, said impeller being dimensioned to rotate very closely to the lower surface of the top of the chamber and very close to the bottom surface of the bottom of said chamber, said oil duct being positioned adjacent the arcuate section of said chamber, and an oil reservoir surrounding said pump chamber and impeller and the end of said shaft and being adapted to maintain oil above and around said impeller and chamber whereby oil can enter the bottom of said impeller and be moved radially outwardly by said impeller blades, irrespective of the direction of rotation of said impeller and can be moved to said oil duct and can be raised upwardly against the force of gravity to lubricate said shaft, said plane portions of said chamber being equal in area and distance whereby a full and easy flow of oil from the impeller to the oil duct is provided whenever the impeller rotates.

2. In an impeller for oil, the improvement which comprises an oil chamber having a top, an opening in said top that surrounds and closely confines the lower end of a rotatable shaft, a rotary impeller secured to and rotatable with said shaft, said rotary impeller having an upper surface that is spaced from said top of the chamber a very short distance and is tightly sealed to said shaft, said upper surface of said impeller underlying and projecting radially outward beyond said opening in the top of said chamber, and a portion of said shaft that overlies said opening in said top of said chamber and projects radially outward beyond said opening, said portion of said shaft being closely adjacent said top of said chamber whereby a tortuous path is presented to oil entering or leaving said chamber through said opening, and whereby oil tending to enter said chamber through said opening will contact said rotating impeller and will be given a component of speed which will cause said oil to move outwardly radially from the shaft and thus to move against the pressure exerted in said chamber by the impeller blades, thus preventing influx or efflux of oil from said chamber and permitting the creation of oil pressures therein.

3. In a dynamo electric machine, a vertically-disposed rotatable shaft, a rotary impeller secured to and rotatable with said shaft, a chamber surrounding said impeller, and an oil duct that has the lower end thereof communicating with said chamber and has the upper end thereof projecting inwarly toward said shaft for lubricating same, said impeller having an upper wall with an opening that receives the lower end of said shaft and fits closely around and against the shaft so that oil cannot pass between said wall and said shaft, said impeller having a lower wall of annular form that is provided with a radially-extending flange which is offset from said wall by an abrupt bend of annular form, said impeller having a plurality of plane, radially-extending blades positioned between said upper and lower walls, said blades extending from the periphery of the opening in said lower wall of said impeller to the outer periphery of said upper wall of said impeller, said chamber having a top with an opening that receives and closely fits said shaft and an opening that communicates with said oil duct, said chamber having a bottom with an opening that is spaced from the outer periphery of said impeller blades, said chamber having a cylindrical wall section, a small-diameter wall section, and two plane wall sections that are each tangential to said cylindrical and arcuate wall sections, said top of said chamber overlying and being closely adjacent to the upper wall of said rotary impeller, said bottom of said chamber overlying and being closely adjacent to the annular flange of said rotary impeller whereby leakage of oil from said chamber is impeded.

4. In a dynamo electric machine, a rotatable shaft, a rotary impeller secured to and rotatable with said shaft, a chamber surrounding said impeller, and an oil duct that has one end thereof communicating with said chamber and has the other end thereof projecting upwardly from said chamber, said impeller having an upper wall that cooperates with said shaft to prevent passage of oil between said wall and said shaft, said impeller having a lower wall of annular form that is provided with a radially-extending flange which is offset from said wall by an abrupt bend of annular form, said impeller having a plurality of plane, radially-extending blades positioned between said upper and lower walls, said blades extending from the periphery of the opening in said lower wall of said impeller to the outer periphery of said upper wall of said impeller, said chamber having a top, said chamber having a bottom with an opening that is spaced from the outer periphery of said impeller blades, said chamber having an opening communicating with said oil duct, said top of said chamber overlying and being closely adjacent to the upper wall of said rotary impeller, said bottom of said chamber fitting close to said lower wall of said impeller.

5. In a dynamo electric machine, a rotatable shaft, a rotary impeller secured to and rotatable with said shaft, a chamber surrounding said impeller, and an oil duct that has one end thereof communicating with said chamber and has the other end thereof projecting upwardly from said chamber, said impeller having an upper wall that cooperates with said shaft to prevent passage of oil between said wall and said shaft, said impeller having a lower wall of annular form to provide an inlet for oil, said impeller having a plurality of plane, radially-extending blades positioned between said upper and lower walls of said impeller, said shaft having a relatively large diameter portion immediately above said chamber and having a portion of reduced diameter within said chamber, said portions being sharply offset from each other, said chamber having a top with an opening that receives and closely fits said reduced diameter portion of said shaft, said chamber having a bottom with an opening that is spaced from the outer periphery of said impeller blades, said chamber having an opening communicating with said oil duct, said top of said chamber overlying and being closely adjacent to the upper wall of said rotary impeller whereby leakage of oil from said chamber is impeded.

6. In a dynamo electric machine, a rotatable shaft, a rotary impeller secured to and rotatable with said shaft, a chamber surrounding said impeller, and an oil duct that has one end thereof communicating with said chamber and has the other end thereof projecting upwardly from said chamber, said impeller having a lower wall of annular form to provide an inlet for oil, said impeller having a plurality of plane, radially-extending blades, said chamber having a bottom with an opening that is spaced from the outer periphery of said impeller blades, said chamber having an opening communicating with said oil duct, said bottom of said chamber being closely adjacent the lower wall of said impeller whereby leakage of oil from said chamber is impeded, said chamber having a large-radius arcuate portion to enclose said impeller and having a small-radius arcuate portion spaced from said large-radius arcuate portion by tangentially extending walls, said opening in said chamber that communicates with said oil duct being in said small-radius arcuate portion of said chamber.

7. In a dynamo electric machine, a rotatable shaft, a rotary impeller secured to and rotatable with said shaft, a chamber surrounding said impeller, and an oil duct that has one end thereof communicating with said chamber and has the other end thereof projecting upwardly from said chamber, said impeller having an upper wall that cooperates with said shaft to prevent passage of oil between said wall and said shaft, said chamber having a top with an opening that receives and closely fits said shaft, said top of said chamber overlying and being closely adjacent to the upper wall of said rotary impeller whereby leakage of oil from said chamber is impeded, said chamber having an opening in the bottom thereof, said impeller having a bottom wall with a diameter greater than that of said opening in said bottom wall of said chamber, said bottom wall of said impeller underlying but being closely adjacent said bottom wall of said chamber.

8. In a dynamo electric machine, a rotatable shaft, a rotary impeller secured to and rotatable with said shaft, a chamber surrounding said impeller, and an oil duct that has one end thereof communicating with said chamber and has the other end thereof projecting upwardly from said chamber, said impeller having a lower wall of annular form to provide an inlet for oil and having an offset flange of annular form, said impeller having a plurality of plane, radially-extending blades, said chamber having a bottom with an opening that is spaced from the outer periphery of said impeller blades, said bottom of said chamber overlying and being closely adjacent to the annular flange of said rotary impeller whereby leakage of oil from said chamber is impeded.

9. In a dynamo electric machine, a rotatable shaft, a rotary impeller secured to and rotatable with said shaft, a chamber surrounding said impeller, and an oil duct that has one end thereof communicating with said chamber and has the other end thereof projecting upwardly from said chamber, said impeller having a lower wall of annular form to provide an inlet for oil and having a radially-extending flange that is offset from said wall by an abrupt bend of annular form, said impeller having a plurality of plane, radially-extending blades, said chamber having a bottom with an opening that is spaced from the outer periphery of said impeller blades, said bottom of said chamber overlying and being closely adjacent to the annular flange of said rotary impeller, said blades of said impeller contacting oil that enters the chamber through the opening in the annular lower wall of said impeller and forcing that oil outwardly into said chamber, said bottom of said chamber being vertically spaced from said flange to permit rotation of said impeller but being positioned close to said flange to impede leakage of oil from said chamber.

10. In a dynamo electric machine, a rotatable shaft, a rotary impeller secured to and rotatable with said shaft, a chamber surrounding said impeller, and an oil duct that has one end thereof communicating with said chamber and has the other end thereof projecting upwardly from said chamber, said impeller having an upper wall that cooperates with said shaft to prevent passage of oil between said wall and said shaft, said impeller having a lower wall of annular form to provide an inlet for oil, said impeller having a plurality of plane, radially-extending blades positioned between said upper and lower walls, said chamber having a top with an opening that receives and closely fits said shaft, said chamber having a bottom with an opening that is spaced from the outer periphery of said impeller blades, said shaft having a portion thereof with a diameter larger than that of said opening in the top of said chamber, said portion being spaced closely adjacent to and overlying the top of said chamber, said shaft having a portion of reduced diameter positioned within said chamber, said two portions of said shaft being separated by a shoulder, said lower wall of said impeller having a diameter greater than that of said opening in the bottom of said chamber, said lower wall of said impeller being closely adjacent to and underlying said bottom of said chamber.

11. In a dynamo electric machine, a rotatable shaft, a rotary impeller secured to and rotatable with said shaft, a chamber surrounding said impeller, and an oil duct that has one end thereof communicating with said chamber and has the other end thereof projecting upwardly from said chamber, said impeller having an upper wall that cooperates with said shaft to prevent passage of oil between said wall and said shaft, said impeller having a lower wall of annular form to provide an inlet for oil and having an offset flange of annular form, said impeller having a plurality of plane, radially-extending blades positioned between said upper and lower walls, said chamber having a top with an opening that receives and closely fits said shaft, said chamber having a bottom with an opening that is spaced from the outer periphery of said impeller blades, said top of said chamber overlying and being closely adjacent to the upper wall of said rotary impeller, said bottom of said chamber overlying and being closely adjacent to the annular flange of said rotary impeller whereby leakage of oil from said chamber is impeded.

12. In a dynamo electric machine, a rotatable shaft, a rotary impeller secured to and rotatable with said shaft, a chamber surrounding said impeller, and an oil duct that has one end thereof communicating with said chamber and has the other end thereof projecting upwardly from said chamber, said impeller having an upper wall that cooperates with said shaft to prevent passage of oil between said wall and said shaft, said impeller having a lower wall of annular form to provide an inlet for oil, and having a radially-extending flange that is offset from said wall by an abrupt bend of annular form, said impeller having a plurality of plane, radially-extending blades positioned between said upper and lower walls, said chamber having a top with an opening that receives and closely fits said shaft, said chamber having a bottom with an opening that is spaced from the outer periphery of said impeller blades and is spaced close to said annular flange.

CLARENCE O'DANIEL.

REFERENCES CITED

The following references are of record in the file of this patent:

UNITED STATES PATENTS

| Number | Name | Date |
|---|---|---|
| 1,736,966 | Delaval-Crow | Nov. 26, 1929 |
| 2,112,386 | Steele et al. | Mar. 29, 1938 |
| 2,300,688 | Nagle | Nov. 3, 1942 |
| 2,420,401 | Prokofieff | May 13, 1947 |